(12) United States Patent
Horn et al.

(10) Patent No.: US 8,401,555 B2
(45) Date of Patent: Mar. 19, 2013

(54) RECEIVER STATUS MESSAGE MANAGEMENT DURING HANDOFF

(75) Inventors: Gavin Bernard Horn, La Jolla, CA (US); Fatih Ulupinar, San Diego, CA (US); Nileshkumar J. Parekh, San Diego, CA (US); Charles A. Bergan, Cardiff, CA (US)

(73) Assignee: QUALCOMM Incorporated, San Diego, CA (US)

( * ) Notice: Subject to any disclaimer, the term of this patent is extended or adjusted under 35 U.S.C. 154(b) by 967 days.

(21) Appl. No.: 11/564,831

(22) Filed: Nov. 29, 2006

(65) Prior Publication Data

US 2007/0167163 A1    Jul. 19, 2007

Related U.S. Application Data

(60) Provisional application No. 60/741,325, filed on Nov. 30, 2005.

(51) Int. Cl.
*H04W 4/00* (2009.01)
*H04W 36/00* (2009.01)

(52) U.S. Cl. ......... 455/436; 370/331; 455/442; 455/439

(58) Field of Classification Search .................. 455/436, 455/442, 443, 450, 403, 439; 370/401, 331, 370/389
See application file for complete search history.

(56) References Cited

U.S. PATENT DOCUMENTS

| | | | | |
|---|---|---|---|---|
| 6,055,427 A * | 4/2000 | Ojaniemi | ........................ | 455/436 |
| 6,134,444 A * | 10/2000 | Kotzin | ........................ | 455/453 |
| 2001/0021180 A1 * | 9/2001 | Lee et al. | ........................ | 370/336 |
| 2002/0147016 A1 * | 10/2002 | Arazi et al. | ........................ | 455/443 |
| 2003/0022654 A1 * | 1/2003 | Kakani et al. | ........................ | 455/403 |
| 2004/0160925 A1 | 8/2004 | Heo et al. | | |
| 2004/0246917 A1 * | 12/2004 | Cheng et al. | ........................ | 370/328 |
| 2005/0096052 A1 * | 5/2005 | Csapo et al. | ........................ | 455/439 |
| 2005/0111389 A1 * | 5/2005 | Dick et al. | ........................ | 370/278 |
| 2006/0116118 A1 * | 6/2006 | Charriere et al. | ........................ | 455/423 |
| 2007/0014259 A1 * | 1/2007 | Fajardo et al. | ........................ | 370/331 |
| 2007/0189282 A1 * | 8/2007 | Lohr et al. | ........................ | 370/370 |

FOREIGN PATENT DOCUMENTS

| CN | 1534915 A | 10/2004 |
|---|---|---|
| WO | WO2004091129 | 10/2004 |

OTHER PUBLICATIONS

International Search Report and Written Opinion—PCT/US2006/061442, International Search Authority—European Patent Office—Nov. 22, 2007.
Taiwan Search Report—TW095144868—TIPO—Apr. 18, 2011.

* cited by examiner

*Primary Examiner* — George Eng
*Assistant Examiner* — Nizar Sivji
(74) *Attorney, Agent, or Firm* — Darren M. Simon

(57) ABSTRACT

Described herein are mechanisms and methods that facilitate generation of receiver status message (e.g., acknowledgments and/or negative acknowledgments) before, during, and after a handoff of an access terminal (user equipment) from a first transceiver module to a second transceiver module. A network module can generate receiver status messages during a handoff and informs a target transceiver module of when it can begin to generate receiver status messages for data received from an access terminal.

25 Claims, 15 Drawing Sheets

RECEIVER STATUS MESSAGE MANAGEMENT DURING HANDOFF

CROSS-REFERENCE TO RELATED APPLICATION

This application claims the benefit of U.S. Provisional Patent application Ser. No. 60/741,325 entitled "METHOD AND APPARATUS FOR REVERSE LINK HANDOFF" which was filed Nov. 30, 2005. The entirety of the aforementioned application is herein incorporated by reference.

BACKGROUND

I. Field

The following description relates generally to wireless communications, and, amongst other things, to flexible communication schemes for wireless communications systems.

II. Background

Over the last several years, wireless communications technologies have evolved from analog-driven systems (which are expensive to maintain and operate) to digital (packet-switched) systems. In conventional analog systems, analog signals are relayed on a forward link and a reverse link and typically require a significant amount of bandwidth to enable signals to be transmitted and received while being associated with suitable quality. As the analog signals are continuous in time and space, no status messages (e.g., messages indicating receipt or non-receipt of data) need to be generated. In contrast, packet-switched systems allow analog signals to be converted to data packets and transmitted by way of a physical channel between an access terminal and a base station, router, etc. Additionally, digital data can be relayed in its natural form (e.g., text, Internet data, . . . ) through utilization of a packet switched network.

When data is relayed in packets over an over-the-air (OTA) connection, however, some packets may be lost. Pursuant to an example, data packets created by an access terminal (e.g., mobile telephone) can include a header, and information within such header can indicate a sequence number of a data packet. A module within a network can arrange the data packets according to information within the packet header and determine whether a suitable number of packets (out of all possibly received packets) have been received. Pursuant to an example, ACKs and/or NAKs can be created and provided to access terminal over a forward link. The converse also holds true; the access terminal can create receiver status messages (e.g., ACKs and/or NAKs) with respect to data received over a forward link.

In particular network architectures, however, generation of receiver status messages on the network side is a non-trivial task. For instance, an example network architecture can include transceiver modules that provide an air interface attachment to an access terminal. The transceiver modules can be communicatively coupled to a network module, which can provide an Internet attachment point for the access terminal. In such an architecture, conventionally the network module is charged with creating receiver status messages for data received from the access terminal. In more detail, the access terminal can provide data over a reverse link to a transceiver module, which in turn forwards such data to the network module. The network module analyzes the data packets and generates receiver status messages based at least in part upon the analysis. The receiver status messages are transmitted to a transceiver module that is servicing the access terminal, and such messages are then transmitted to the access terminal. The generation of receiver status messages by the network module (in a tiered network architecture) is problematic in that a significant amount of time is required between the access terminal transmitting data and the receipt of receiver status messages at the access terminal with respect to the transmitted data.

SUMMARY

The following presents a simplified summary in order to provide a basic understanding of some aspects of the disclosed subject matter. This summary is not an extensive overview, and is not intended to identify key/critical elements or to delineate the scope of such subject matter. Its sole purpose is to present some concepts in a simplified form as a prelude to the more detailed description that is presented later.

Briefly described, the subject disclosure pertains to enabling network elements at the edge of a network to create receiver status messages (e.g., ACKs and/or NAKs) locally within a tiered network architecture, thereby reducing an amount of time required to provide receiver status messages to an access terminal with respect to data generated at the access terminal. For instance, the tiered architecture can include one or more transceiver modules that provide an over-the-air (OTA) attachment point for an access terminal. The transceiver module(s) can communicate with a network module, which provides an Internet attachment point for the access terminal. Conventionally, the network module creates receiver status messages for data transmitted by the access terminal—however, due to the "round trip" of data required (e.g., from an access terminal, to a transceiver module, to a network module where receiver status messages are created, back to the transceiver module, and then to the access terminal) a significant amount of time is required for such generation. As described herein, transceiver modules can generate receiver status messages for data received from an access terminal, thereby reducing an amount of time between transmission of data from the access terminal and receipt of a receiver status message. During handoff, transceiver modules and the network module can communicate amongst one another to ensure that an appropriate module is generating receiver status messages. For instance, after an indication of handoff has been received by a network module but before the handoff has been confirmed, the network module can create receiver status messages for data received from the access terminal.

In accordance with an embodiment, a method of handoff for wireless communications can comprise receiving a handoff indication with respect to an access terminal from a target transceiver module and generating a receiver status message for data received from one or more of a source transceiver module and the target transceiver module upon receipt of the indication. The method can also comprise ceasing to generate receiver status messages for data received from one or more of a source transceiver module and the target transceiver module upon confirmation of the handoff. Also described herein is a computer-readable medium that comprises computer-executable instructions for generating a receiver status message for data received from an access terminal by way of one or more transceiver modules, instructing a target transceiver module to begin generating a receiver status message with respect to data received front the access terminal, and ceasing to generate receiver status messages.

In accordance with another aspect, a communications apparatus described herein can include a memory that comprises instructions for instructing a target transceiver module to create receiver status messages with respect to data received from an access terminal and a processor configured to execute the instructions. Moreover, a communications apparatus is disclosed below, wherein the apparatus comprises means for receiving data from a one or more transceiver modules and means for receiving an indication that an access terminal is requesting a handoff from a source transceiver module to a target transceiver module. The apparatus can further include means for instructing the target transceiver module to begin creating receiver status messages with respect to data received from the access terminal. Still further, a processor can be configured to execute instructions for receiving an indication that an access terminal has requested a handoff from a source transceiver module to a target transceiver module and instructing the target transceiver module to begin locally generating receiver status messages for data received from the access terminal.

In yet another aspect, a method described herein can comprise receiving a request for a handoff with respect to an access terminal, receiving data from the access terminal, and generating receiver status messages upon confirmation of the handoff. With respect to a communications apparatus described herein, such apparatus can include a memory that comprises instructions for receiving confirmation from a network module that an access terminal has been handed off from a source transceiver module to a target transceiver module and further instructions for generating receiver status messages for data received from the access terminal upon receipt of the confirmation. The apparatus can additionally include a processor that is configured to execute the instructions within the memory. Additionally, a computer-readable medium disclosed below can comprise computer-executable instructions for receiving an indication that an access terminal has requested a handoff from a source transceiver module to a target transceiver module that comprises the computer-readable medium. The computer-readable medium can also include instructions for receiving data from the access terminal over a physical channel and locally generating receiver status messages with respect to the received data upon confirmation of the handoff.

In accordance with still yet another aspect, a communications apparatus can comprise means for receiving confirmation that an access terminal has been handed off from a source transceiver module to a target transceiver module and means for receiving data from the access terminal. The apparatus can also include means for locally generating receiver status messages at the target transceiver module for the received data and means for transmitting the receiver status messages to the access terminal. In accordance with another embodiment disclosed herein, a processor can be configured to execute instructions for receiving data from an access terminal upon receipt of a confirmation that the access terminal has been handed off from a source transceiver module to a target transceiver module, wherein the confirmation is received from a network module, the source transceiver module and the target transceiver module reside at a network edge and the network module resides above the source transceiver module and the target transceiver module within a network hierarchy. The processor can also be configured to execute instructions for generating receiver status messages for the data received from the access terminal.

To the accomplishment of the foregoing and related ends, certain illustrative aspects are described herein in connection with the following description and the annexed drawings. These aspects are indicative, however, of but a few of the various ways in which the principles of the disclosed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
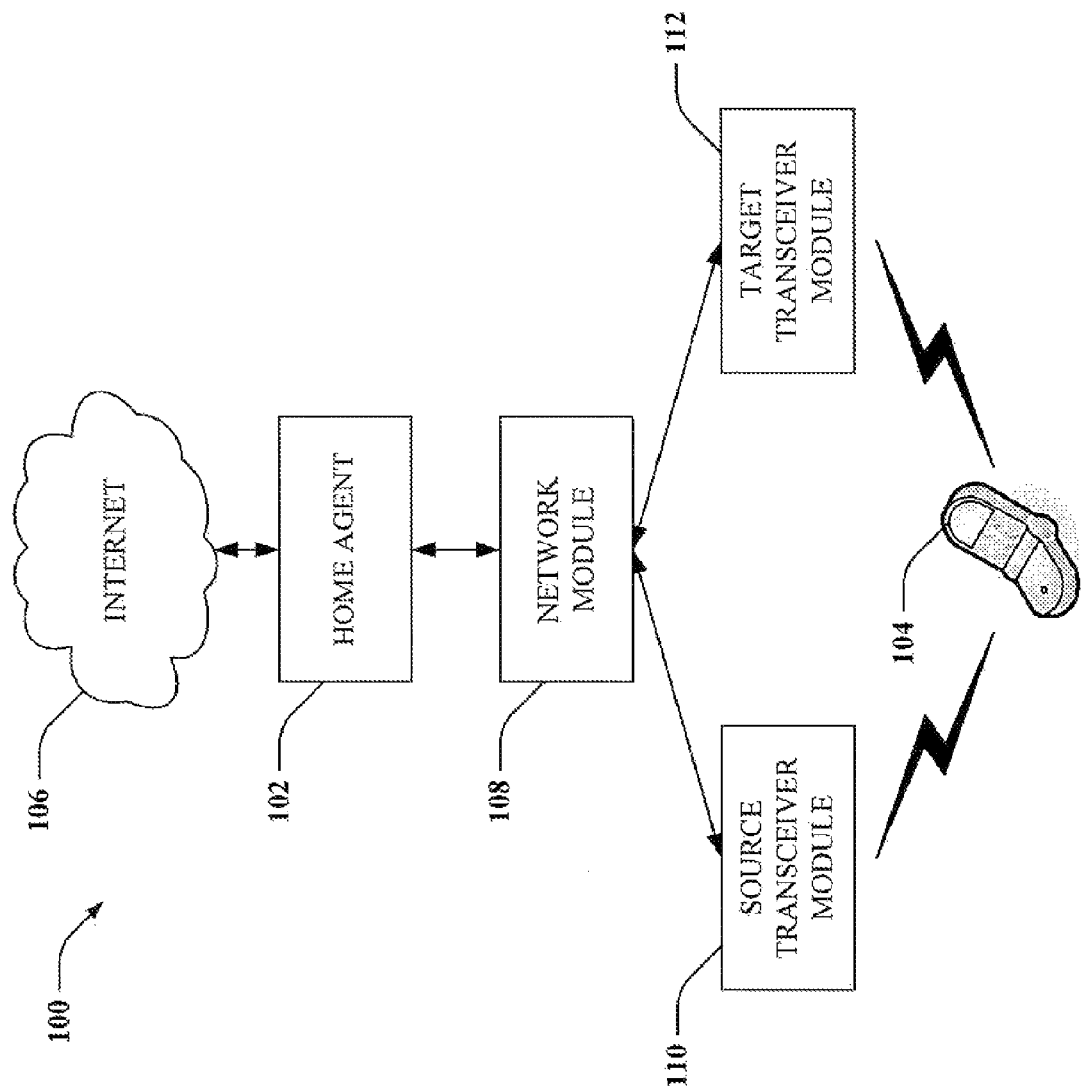
FIG. 1 is an example high-level block diagram of a tiered system architecture, wherein responsibilities for generating receiver status messages with respect to an access terminal alter when a handoff occurs.

The disclosed subject matter is now described with reference to the drawings, wherein like reference numerals are used to refer to like elements throughout. In the following description, for purposes of explanation numerous specific details are set forth in order to provide a thorough understanding of the disclosed subject matter. It may be evident, however, that such subject matter may be practiced without these specific details. In other instances, well-known structures and devices are shown in block diagram form in order to facilitate describing the disclosed subject matter.

Furthermore, various embodiments are described herein in connection with an access terminal. An access terminal can also be called a system, a subscriber unit, subscriber station, mobile station, user equipment, mobile device, remote station, remote terminal, user terminal, terminal, user agent, or user device. For example, an access terminal can be a cellular telephone, a cordless telephone, a Session Initiation Protocol (SIP) phone, a wireless local loop (WLL) station, a PDA, a handheld device having wireless connection capability, a processor within a mobile device, or other processing device connected to a wireless modem.

Moreover, aspects of the disclosed subject matter may be implemented as a method, apparatus, or article of manufacture using standard programming and/or engineering techniques to produce software, firmware, hardware, or any combination thereof to control a computer to implement various aspects described herein. The term "article of manufacture" as used herein is intended to encompass a computer program accessible from any computer-readable device, carrier, or media. For example computer readable media can include but are not limited to magnetic storage devices (e.g., hard disk, floppy disk, magnetic strips . . . ) optical disks (e.g., compact disk (CD), digital versatile disk (DVD) . . . ), smart cards, and flash memory devices (e.g., cards stick, key driven . . . ). Additionally it should be appreciated that a carrier wave can be employed to carry computer-readable electronic data such as those used in transmitting and receiving voice mail or in accessing a network such as a cellular network. Of course, it can be recognized that many modifications may be made to this configuration without departing from the scope or spirit of what is described herein.

Turning now to the drawings, FIG. 1 illustrates a network architecture 100 that can be utilized in association with generating receiver status messages for data received from an access terminal at a network edge. Additionally, a protocol is described herein that defines how receiver status messages are generated during a handoff of an access terminal from a first transceiver module to a second transceiver module. Architecture 100 includes a home agent 102, which can be a router on a home network of an access terminal 104 that maintains information regarding the routing of packets received from the Internet 106 to the access terminal 104. Pursuant to an example, home agent 102 can utilize tunneling mechanisms to forward data from the Internet 106, thereby not requiring an IP address of access terminal 104 to alter each time access terminal 104 connects to the home network from a different location.

Architecture 100 additionally includes a network module 108 that provides an Internet attachment point to access terminal 104. Network module 108 is communicatively coupled to at least one transceiver module. In the example architecture 100, network module 108 is communicatively coupled to a source transceiver module 110 and a target transceiver module 112, wherein transceiver modules 110 and 112 provide an air interface attachment for access terminal 104. Access terminal 104 can be requesting a handoff from source transceiver module 110 to target transceiver module 112 (e.g., due to changing radio conditions). Conventionally, in tiered architectures (such as architecture 100), network module 108 is charged with creating receiver status messages (e.g., NAKs and/or ACKs) with respect to data received over a reverse link from access terminal 104. In more detail, access terminal 104 transmits data over the reverse link (e.g., by way of layer 2 signaling) to, for instance, source transceiver module 110. In conventional systems, source transceiver module 110 provides network module with a subset of the received data (encapsulating the received data in a layer 3 tunnel), and network module 108 then creates receiver status messages for such data and provides it to source transceiver module 110 for transmittal to access terminal 104.

Utilizing network module 108 to generate receiver status messages is wasteful with respect to time. More specifically, a "round trip" must be made between access terminal 104 and network module 108. It can be discerned that receiver status messages can be provided to access terminal 104 more quickly if receiver status messages are generated at an edge of the network (e.g., at transceiver modules 110 and/or 112). Problems can arise, however, when access terminal 104 is handed off from source transceiver module 110 to target transceiver module 112.

Accordingly, a protocol is described herein that defines actions undertaken by access terminal 104, network module 108, and source and target transceiver modules 110 and 112 when access terminal 104 requests a handoff from a transceiver module currently serving access terminal 104 (source transceiver module 110) to a transceiver module that is desirably serving access terminal 104 (target transceiver module 112). In more detail, source transceiver module 110 can be configured to receive data from access terminal 104 over a reverse link and can further be configured to generate receiver status messages for the received data and provide such messages to access terminal 104 over a forward link. The receiver status messages can include one or more of an ACK and a NAK. Additionally, source transceiver module 110 can encapsulate data received from access terminal 104 in accordance with Internet Protocol (IP) tunneling, and can transmit IP-encapsulated data to network module 108.

At some point in time, due to traversal of access terminal 104 to a different geographic location and/or altering radio conditions, access terminal 104 can request a handoff from source transceiver module 110 to target transceiver module 112 by sending a physical layer (layer 2) signal to source transceiver module 110 and/or target transceiver module 112. If target transceiver module 112 receives the request for handoff from access terminal 104, target transceiver module 112 can generate a reverse link assignment message and configure a physical channel for reverse link communications associated with access terminal 104. Alternatively, access terminal 104 can simply begin transmitting data to the target transceiver module (and thus not create a request for a handoff). Additionally, target transceiver module 104 can inform network module 108 that access terminal 104 has issued the request for handoff to target transceiver module 112. Furthermore, target transceiver module 112 can inform source transceiver module 110 that access terminal 104 has requested handoff to target transceiver module 112.

At such point, source transceiver module 110 ceases to generate receiver status messages for data associated with access terminal 104. In one example, source transceiver module 108 can flush data from a buffer associated therewith and transmits the data to network module 108. Alternatively, source transceiver module 110 can continuously provided data it receives from access terminal 104 to network module 108—thus, there is no need to flush data to the network module 108. Additionally, data provided to target transceiver module 112 by access terminal 104 on the reverse link is packaged and forwarded to network module 108, which generates receiver status messages (NAKs and/or ACKs) for the data. Network module 108 then relays the receiver status messages to target transceiver module 112, which in turn provides the receiver status messages to access terminal 104. Upon network module 108 receiving data flushed from source transceiver module 110 and/or reviewing most recent data received from source transceiver module 110, network module 108 cane confirm the handoff and indicate correct buffer state to target transceiver module 112. Thereafter, target transceiver module 112 can generate receiver status messages for data received from access terminal 104.

As can be understood, various permutations to the protocol described above can be contemplated and are intended to fall under the scope of the hereto-appended claims. For instance, source transceiver module 110 can initially receive an indication that access terminal 104 is requesting handoff to target transceiver module 112 and can flush data from within a buffer associated therewith upon receipt of the indication. Thereafter, source transceiver module 110 can ignore a message from target transceiver module 112 that also indicates the handoff. In another examples, network module can inform source transceiver module 110 of a handoff request and/or a handoff request can be inferred when a particular amount of time lapses between receipt of data from access terminal 104 by source transceiver module 110. The crux of the disclosed subject matter revolves around handling of receiver status messages in a network associated with a tiered architecture during/after handoff of access terminal 104 from source transceiver module 110 to target transceiver module 112.

In summary, transceiver modules can be configured to generate receiver status messages for data received on a reverse link from an access terminal associated therewith. During a handoff between two transceiver modules, the network module generates the receiver status messages until it updates the target transceiver module with a state associated with recently received data from the source transceiver module. Thereafter, the target transceiver module can generate receiver status messages for data received from the access terminal. Therefore, except for short amounts of time associated with handoffs, a "round trip" of data is not required between the access terminal and the network module.

Figure 2:
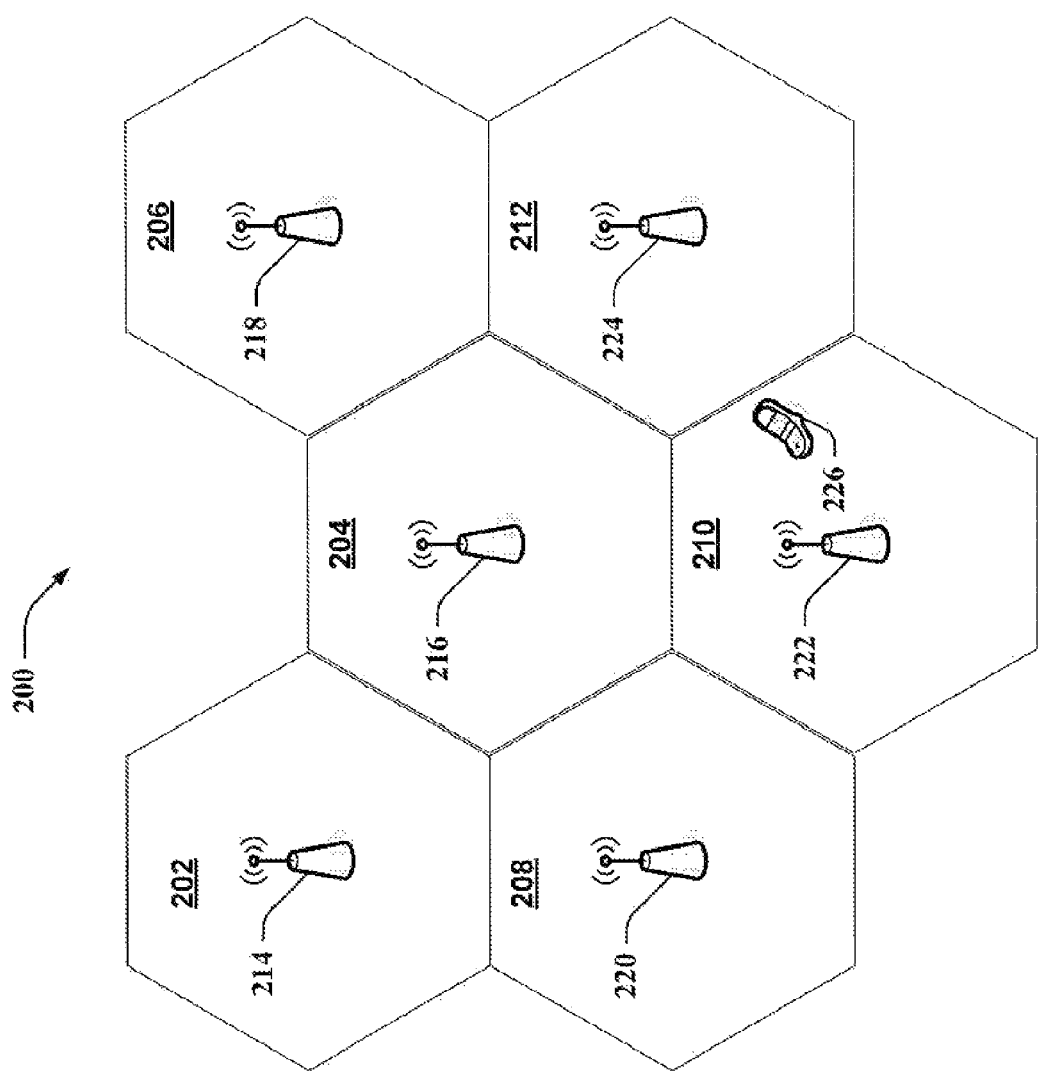
FIG. 2 is an example wireless communications environment.

Now turning to FIG. 2, an example wireless communications system 200 is illustrated. The system 200 includes a plurality of sectors 202-212, wherein an access terminal can employ wireless services within such sectors 202-212. While the sectors 202-212 are shown as being hexagonal in nature and of substantially similar size, it is understood that size and shape of sectors 202-212 can vary depending upon geographical region, number size, and shape of physical impediments, such as buildings, and several other factors. Access points 214-224 are associated with sectors 202-212, wherein access points 214-224 are utilized to provide services to user equipment within sectors 202-212. Access points 214-224 can be or comprise transceiver modules. For instance, access points 214-224 can be base stations and/or wireless routers that comprise transceiver modules. Each of the access points 214-224 can, simultaneously provide service to several access terminals. In the system 200, access terminal 226 is associated with sector 210 and thus can be serviced by access point 222. Access terminal 226, however, may be portable and can therefore transition to disparate sectors (e.g., be subject to handoff between access points). The access points 214-222 can be configured to generate receiver status messages therein with respect to data relayed to access points 214-222 on a reverse link—during handoff, however a network module (not shown) desirably creates the receiver status messages.

In a particular example, access terminal 226 can be communicatively coupled to access point 222, and access point 222 can include a transceiver module (not shown) that generates receiver status messages (e.g., NAKs and/or ACKs) with respect to data received over a reverse link from access terminal 226. Access terminal 226 can request a handoff to, for instance, access point 224 by transmitting a layer 2 signal thereto. Access point 224 can then create a physical channel between access terminal 226 and access point 224 and can receive data from access terminal 226. At such instance, access point 222 is no longer receiving data from access terminal 226, and is thus not generating receiver status messages. Access point 224 can indicate to a network module of the handoff request, and the network module can create receiver status messages for data transmitted from access terminal 226 to access point 224. Meanwhile, access point 222 can be informed of the handoff request and can flush data from a buffer associated therewith and direct such data to the network module. The network module can utilize such data to update a buffer state of access point 224. Thereafter, access point 224 can create receiver status messages for data received from access terminal 226.

Figure 3:
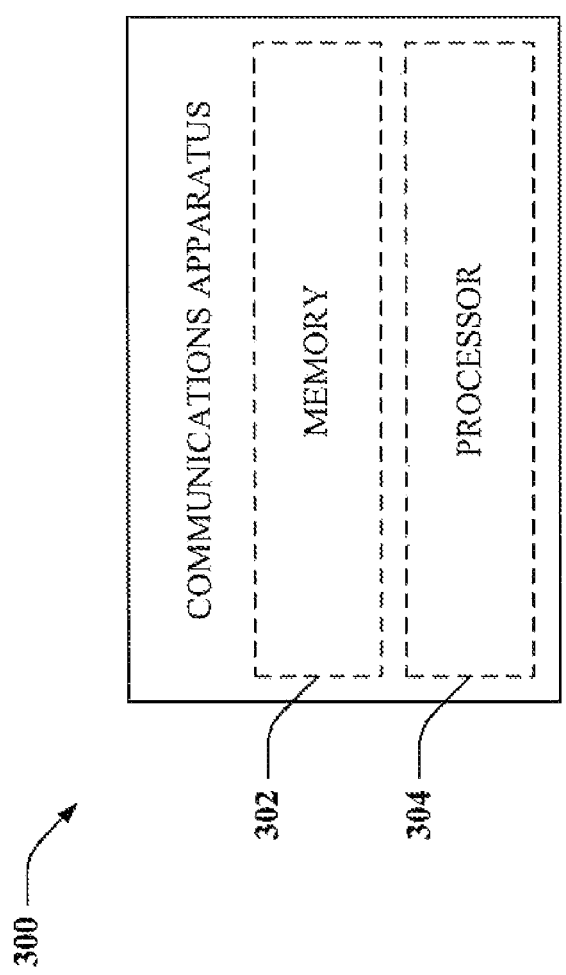
FIG. 3 is an example apparatus that facilitates handling generation of receiver status messages during handoff of an access terminal.

Now referring to FIG. 3, a communications apparatus 300 for employment within a communications environment is illustrated. The apparatus 300 can be a base station or a portion thereof, a router or a portion thereof, a switch or a portion thereof, a gateway or a portion thereof, etc. Apparatus 300 can include a memory 302 that retains various instructions with respect to creation and handling of receiver status messages during a handoff of an access terminal from a source transceiver module to a target transceiver module. For instance, if apparatus 300 is a network module, memory 302 can include instructions for generating receiver status messages for data that is received from an access terminal by way of one or more transceiver modules. More particularly, after an access terminal has requested a handoff from a source transceiver module to a target transceiver module, a network module can generate receiver status messages for data received from the access terminal by way of the target transceiver module. Memory 302 can additionally include instructions for instructing the target transceiver module to being generating receiver status messages with respect to data received from the access terminal. Upon confirming the handoff, the network module can cease generating receiver status messages for data associated with the access terminal (as the target transceiver module is generating such messages). Communications apparatus 300 can also include a processor 304 that is configured to execute the instructions within memory 302.

In another example, communications apparatus 300 can be a source transceiver module, and memory 302 can include instructions relating to generation of receiver status messages (e.g., NAKs and/or ACKs) and ceasing generation of receiver status messages. For instance, memory 302 can include instructions for receiving an indication that an access terminal has requested a handoff from a source transceiver module to a target transceiver module. Memory 302 can also include instructions for flushing data from a buffer associated with the source transceiver module and directing the data to a network module upon receipt of the indication. Thus, the network module can have knowledge of a buffer state of the source transceiver modules, and the network module can update a buffer state of the target transceiver module with such knowledge. Still further, memory 302 can include instructions for generating receiver status messages for data received from the access terminal prior to receiving an indication of the handoff. Again, processor 304 can be configured to execute such instructions.

In still another example, communications apparatus 300 can be a target transceiver module, and memory 302 can include instructions relating to generating receiver status messages for an access terminal. More particularly, memory 302 can comprise instructions for receiving an indication that an access terminal has requested a handoff from a source transceiver module to the target transceiver module. The memory 302 can additionally, include instructions for receiving data from the access terminal over a physical channel and locally generating receiver status messages with respect to the received data upon confirmation of the handoff. Accordingly, prior to receipt of the confirmation, the target transceiver module can package data received from the access terminal in an appropriate manner and relay such data to a network module. The network module can confirm the handoff and update state of a buffer associated with the target transceiver module. Processor 304 can then be utilized to execute the instructions.

Referring to FIGS. 4-7, methodologies relating to generation of receiver status messages in connection with a handoff of an access terminal from a source transceiver module and a target transceiver module are illustrated. While, for purposes of simplicity of explanation, the methodologies are shown and described as a series of acts, it is to be understood and appreciated that the methodologies are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Figure 4:
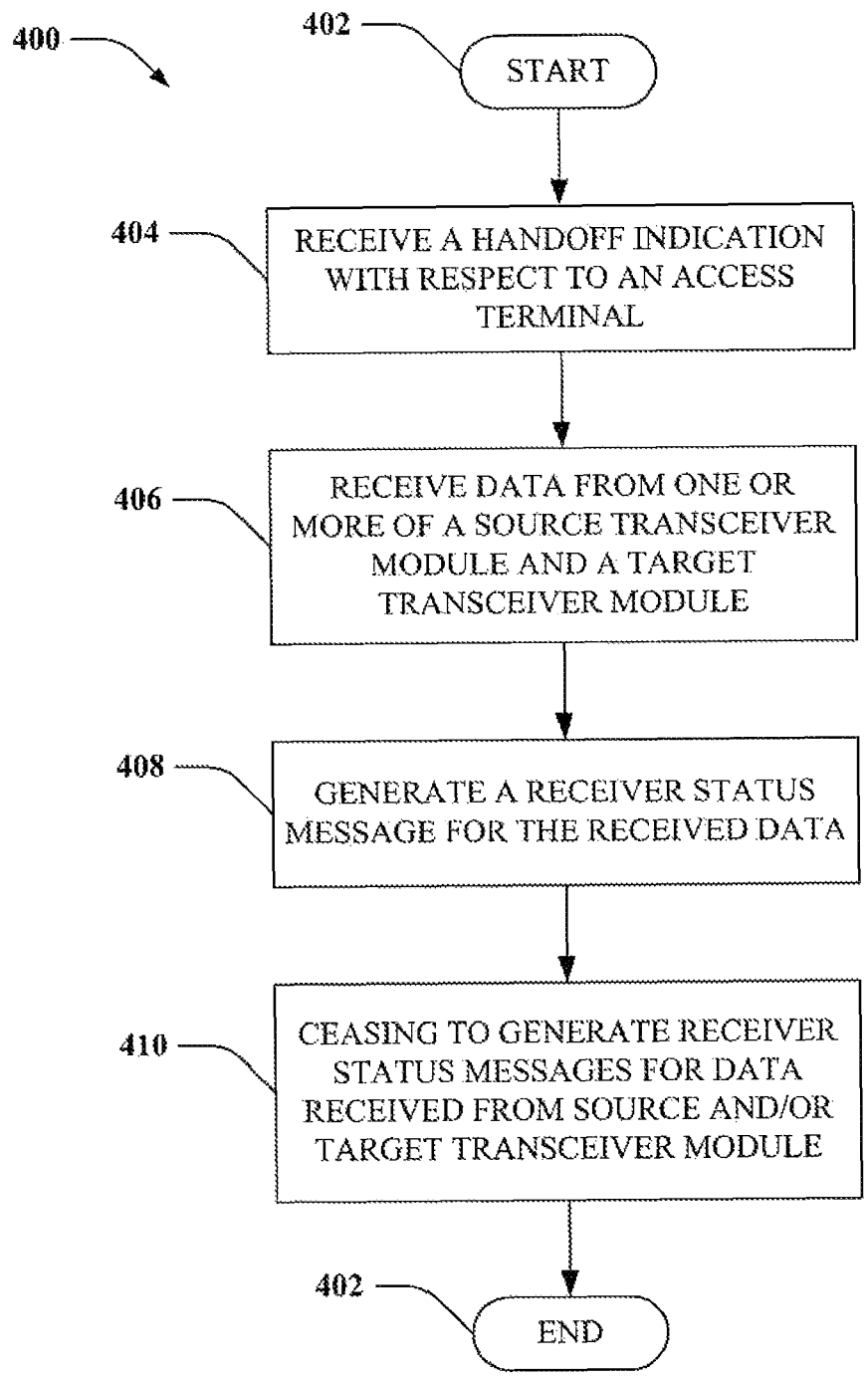
FIG. 4 is a representative flow diagram illustrating an example methodology for instructing transceiver modules when to generate receiver status messages during handoff of an access terminal between transceiver modules.

Referring solely to FIG. 4, a methodology 400 for managing receiver status messages is illustrated. For instance, a network module (which can be a network server) can be configured to perform methodology 400. Methodology 400 begins at 402, and at 404 a handoff indication with respect to an access terminal is received. Pursuant to an example, the access terminal can generate a physical layer signal to indicate that it is requesting a handoff from a source transceiver module to a target transceiver module. At 406, data is received from one or more of a source transceiver module and a target transceiver module, wherein the received data originates from the access terminal. For instance, the access terminal can transmit data to the target transceiver module over a reverse link, and the target transceiver module can package and transmit the data to a network module.

At 408, receiver status messages are generated for the received data. For instance, the receiver status messages can include acknowledgments, negative acknowledgments, or a combination of acknowledgments and negative acknowledgments. Additionally, these receiver status messages can be provided to the access terminal by way of the target transceiver module or even a third transceiver module that is not currently receiving any reverse link data from the access terminal. Thus, for instance, if a data packet is lost during transmission, the network module can generate a negative acknowledgment with respect to such data packet. At 410, the network module ceases to generate receiver status messages for data received from the source and/or target transceiver module. Rather, the target transceiver module is configured to generate the receiver status messages. The methodology 400 then completes at 412.

Figure 5:
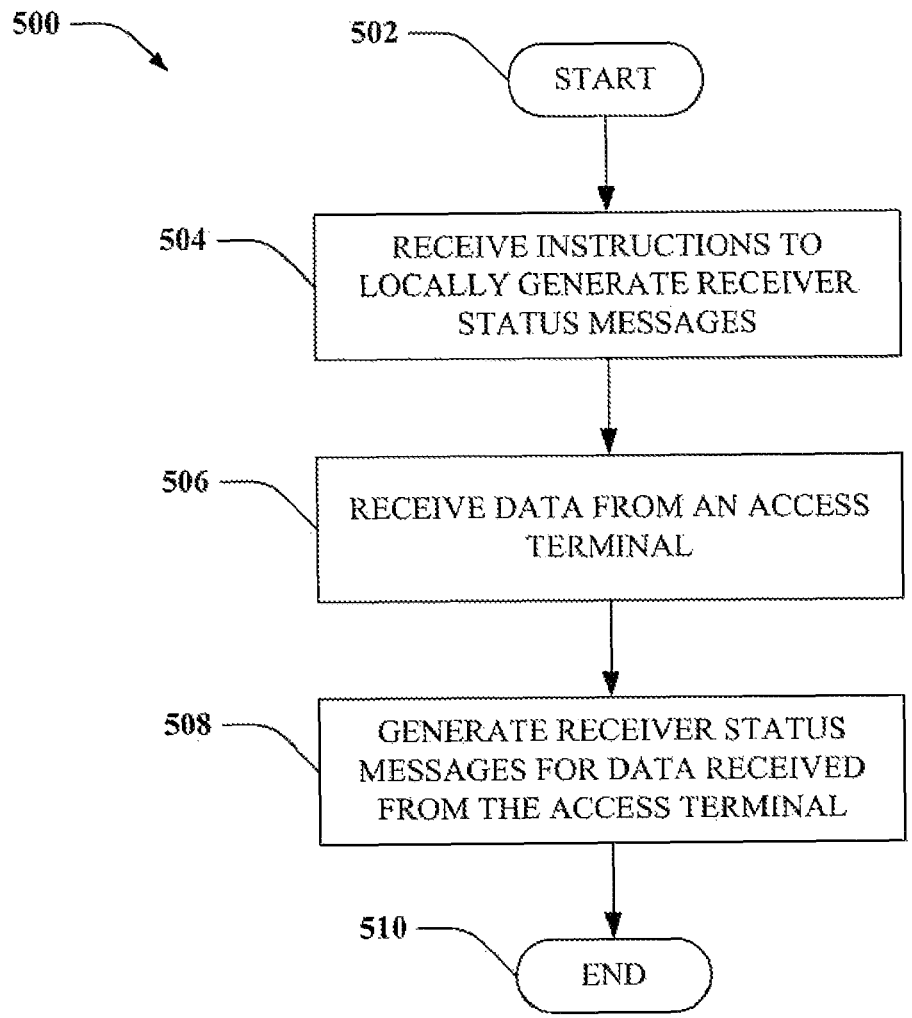
FIG. 5 is a representative flow diagram illustrating an example methodology for generating receiver status messages for an access terminal at a network edge.

Turning now to FIG. 5, a methodology 500 for generating receiver status messages at a network edge is illustrated. For example a base station can be configured to execute the methodology 500. The methodology 500 starts at 502, and at 504 instructions are received to locally generate receiver status messages. The instructions can be received by a transceiver module (from a network module) before handoff or after handoff. At 506, data is received from an access terminal at a transceiver module, and at 508 the transceiver module can generate receiver status messages for data received from the access terminal. The methodology 500 then completes at 510.

Figure 6:
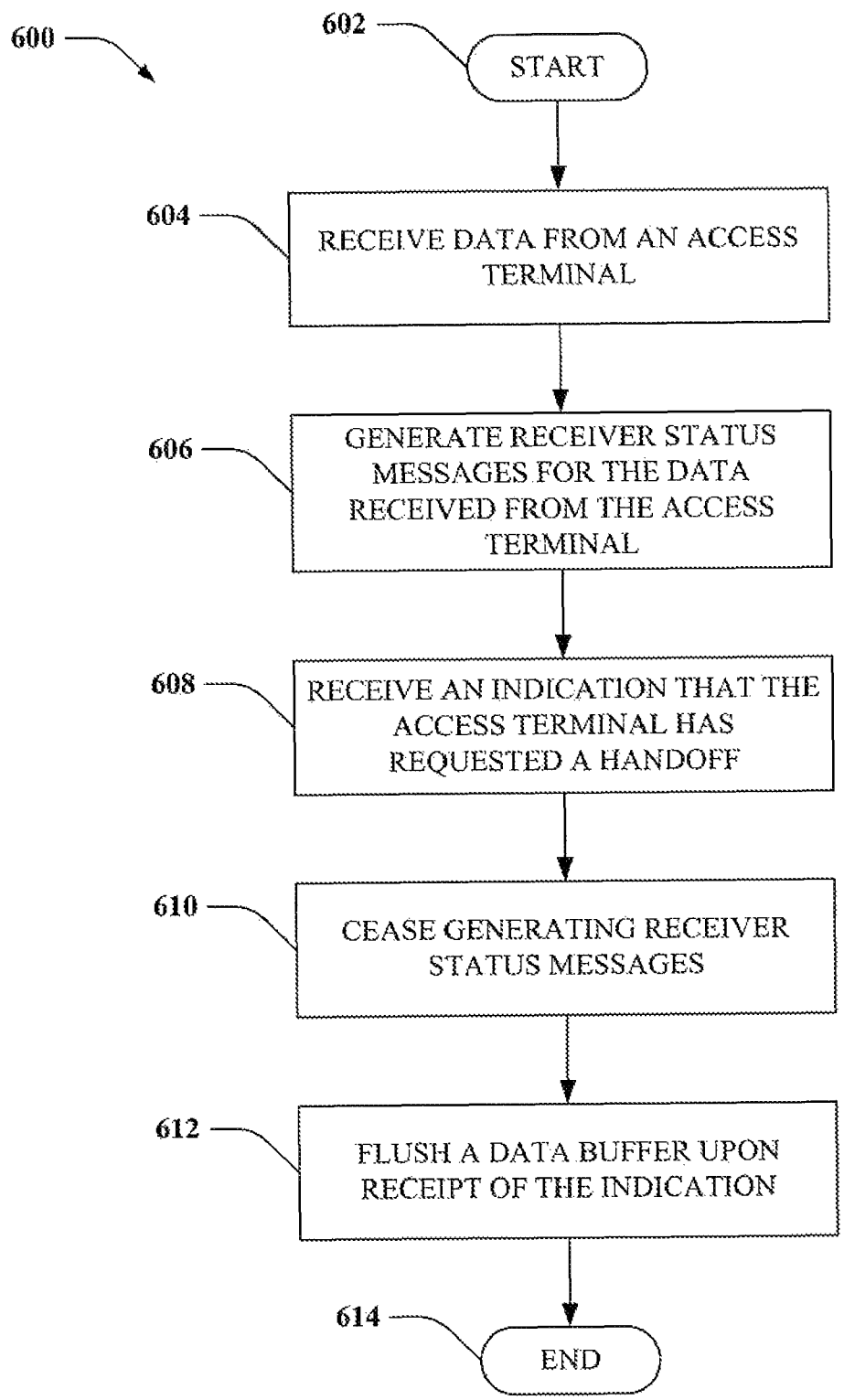
FIG. 6 is a representative flow diagram illustrating an example methodology for flushing a data buffer upon receipt of an indication that an access terminal has requested a handoff from a first transceiver module to a second transceiver module.

With reference now to FIG. 6, a methodology 600 that relates to generation of receiver status messages at a source transceiver module is illustrated. The methodology 600 starts at 602, and at 604 data is received from an access terminal at the source transceiver module over a reverse link. At 606, receiver status messages (e.g., ACKs, NAKs, or a combination thereof) are generated at the source transceiver module and are provided to the access terminal or a forward link. At 608, an indication is received that the access terminal has requested a handoff. For instance, the indication can be received from a target transceiver module (e.g., a transceiver module to which the access terminal desirably hands off). In another example, the indication can be received directly from the access terminal.

At 610, the source transceiver module ceases to generate receiver status messages (as it is no longer receiving data from the access terminal), and at 612 the data buffer of the source transceiver module is flushed. Data from the buffer can be provided to a network module, thereby enabling the network module to obtain knowledge of the buffer state. The network module can then update the target transceiver with an appropriate buffer state, and the target transceiver module can thereafter create receiver status messages for data received from the access terminal. The methodology 600 then completes at 614.

Figure 7:
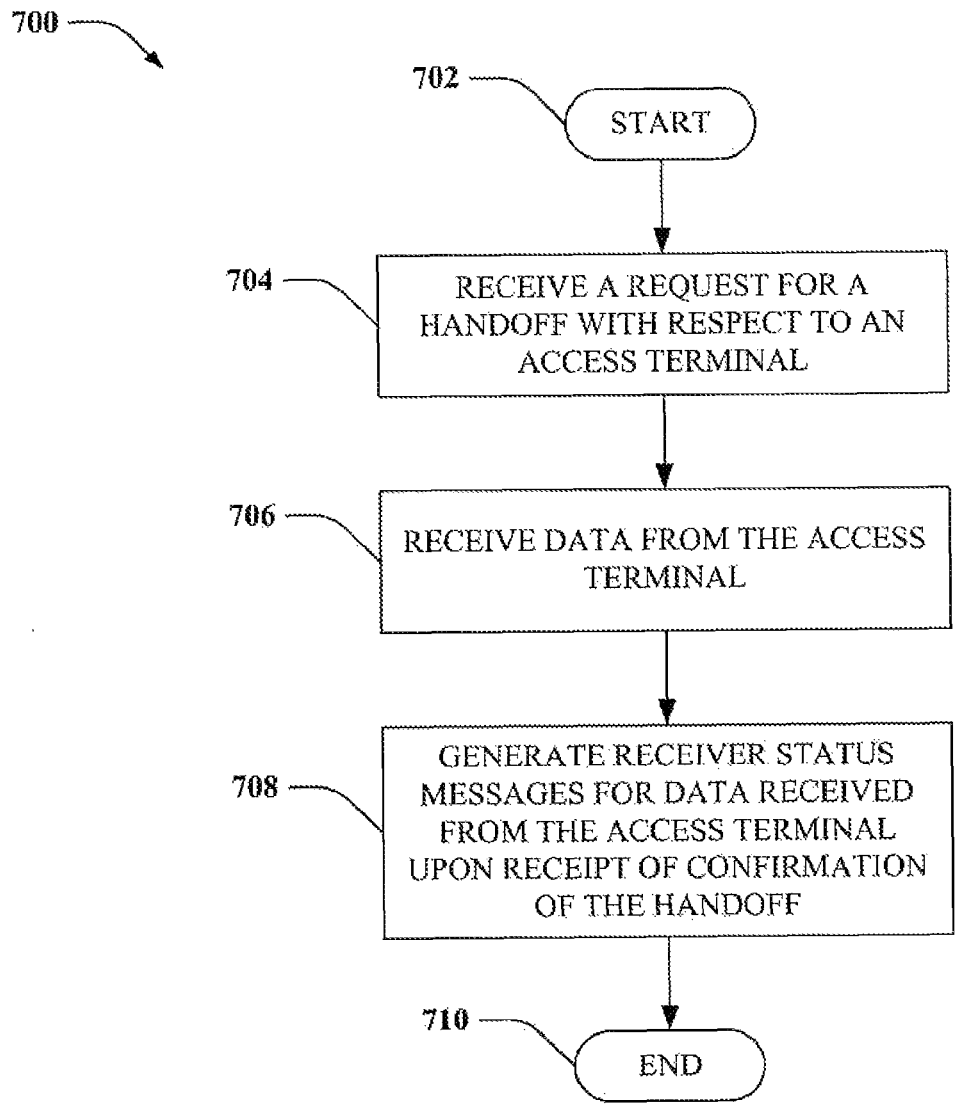
FIG. 7 is a representative flow diagram illustrating an example methodology for generating receiver status messages at a network edge.

Now referring to FIG. 7, a methodology 700 for generating receiver status messages with respect to data received from an access terminal is illustrated. The methodology 700 can be, for example, executed by a module on an edge of a network, such as within a base station, a wireless router, etc. The methodology 700 starts at 702, and at 704 a request for a handoff is received with respect to the access terminal. More particularly, the access terminal can generate a physical layer signal and transmit such signal to the target transceiver module. At 706, data is received from the access terminal at the target transceiver module. At 708, the target transceiver module generates receiver status messages for data received from the access terminal upon receipt of confirmation of the handoff. Pursuant to an example, a network module can confirm the handoff updating a buffer state of the target transceiver module. The methodology 700 then completes at 710.

Figure 8:
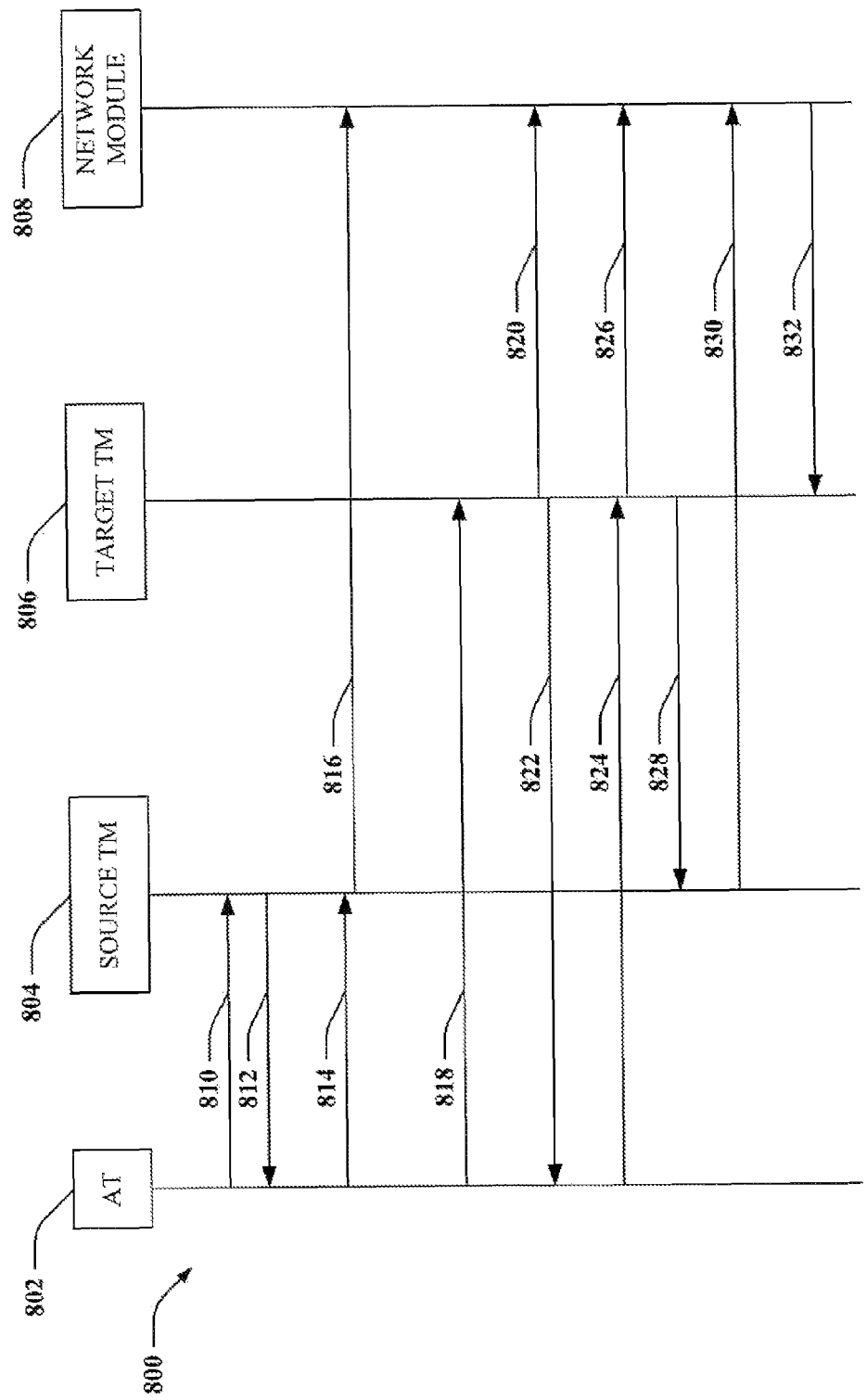
FIG. 8 is an example flow diagram illustrating interaction amongst modules during a handoff.

Turning now to FIG. 8, a flow diagram 800 illustrating actions undertaken with respect to creating receiver status messages before, during, and after a handoff is illustrated. The flow diagram 800 illustrates interaction between an access terminal 802, a source transceiver module 804, a target transceiver module 806, and a network module 808. As described above, network module 808 can provide a point of attachment to the Internet for access terminal 802 and can communicate with source and target transceiver modules 804 and 806 respectively, by way of layer 3 signaling. Source and/or target transceiver modules 804 and 806 can provide an over-the-air (OTA) interface with respect to access terminal 802, and can send and receive data with respect to access terminal 802 by way of layer 2 signaling.

At 810, access terminal 802 requests reverse link resources from source transceiver module 804. Source transceiver module 804 can respond to such request at 812 by creating a reverse link assignment message and transmitting such message to access terminal 802. Upon receipt of such message, access terminal 802 can begin transmitting data to source transceiver module 804 by way of an OTA link at 814. At 816 source transceiver module 804 packages data received from access terminal to accord to an appropriate format (e.g., the Internet Protocol) and transmit a subject of the data to network module 808. Additionally, source transceiver module 804 can be configured to generate receiver status messages with respect to data received from access terminal 804 at 814.

At 818, access terminal 802 decides to undertake a handoff to target transceiver module 806 and transmits a switch request, which can be a physical layer signal transmitted from access terminal. While shown as being directed towards target transceiver module 806, it is understood that the switch request can be received by source transceiver module 804 or by both target transceiver module 806 and source transceiver module 804. Alternatively, access terminal 802 need not generate a request for a handoff, rather, access terminal 802 can simply begin transmitting data to target transceiver module 806. If target transceiver module 806 receives the switch request prior to source transceiver module 804, at 820 target transceiver module can generate a message and transmit the message to network module 808, wherein the message indicates that access terminal 802 has requested handoff to target transceiver module 806. Pursuant to an example, the message can indicate that target transceiver module 806 desires to provide services to access terminal 802, including generating receiver status messages for data received from access terminal 802.

At 822, target transceiver module can create a reverse link assignment message in response to the switch request created by access terminal 802, and target transceiver module 806 can transmit such assignment message to access terminal 802. Thus, a reverse link is created between access terminal 802 and target transceiver module 806, and access terminal 802 can begin transmitting data over such link. At 824, access terminal 802 can transmit data over the reverse link to target transceiver module 806, which can then relay at least a fragment of such data to network module 808 at 826. Once network module 808 becomes aware of the handoff, network module 808 can create receiver status messages for data received from access terminal 802 by way of target transceiver module 806.

At 828, target transceiver module 806 can inform source transceiver module 804 of a handoff of access terminal 802 from source transceiver module 804 to target transceiver module 806 by generating a certain message that indicates the handoff. If source transceiver module 804 has already received an indication of handoff from access terminal 802 (or another module), source transceiver module 804 can ignore the message. In response to receiving the message from target transceiver module 806 or from receiving an indication of handoff from access terminal 802, at 830 source transceiver module 806 can flush data from a buffer associated therewith and provide such data to network module 808. This enables network module 808 to determine a state of the buffer of source transceiver module 804. At 832 network module 808 can update target transceiver module with correct buffer state information as well as confirm the handoff of access terminal 802 from source transceiver module 804 to target transceiver module 806. Thereafter, target transceiver module 806 is prepared to generate receiver status messages for data received over the reverse link from access terminal 802. Additionally, after confirming handoff, network module 808 can cease creating receiver status messages with respect to data received from access terminal 802.

Figure 9:
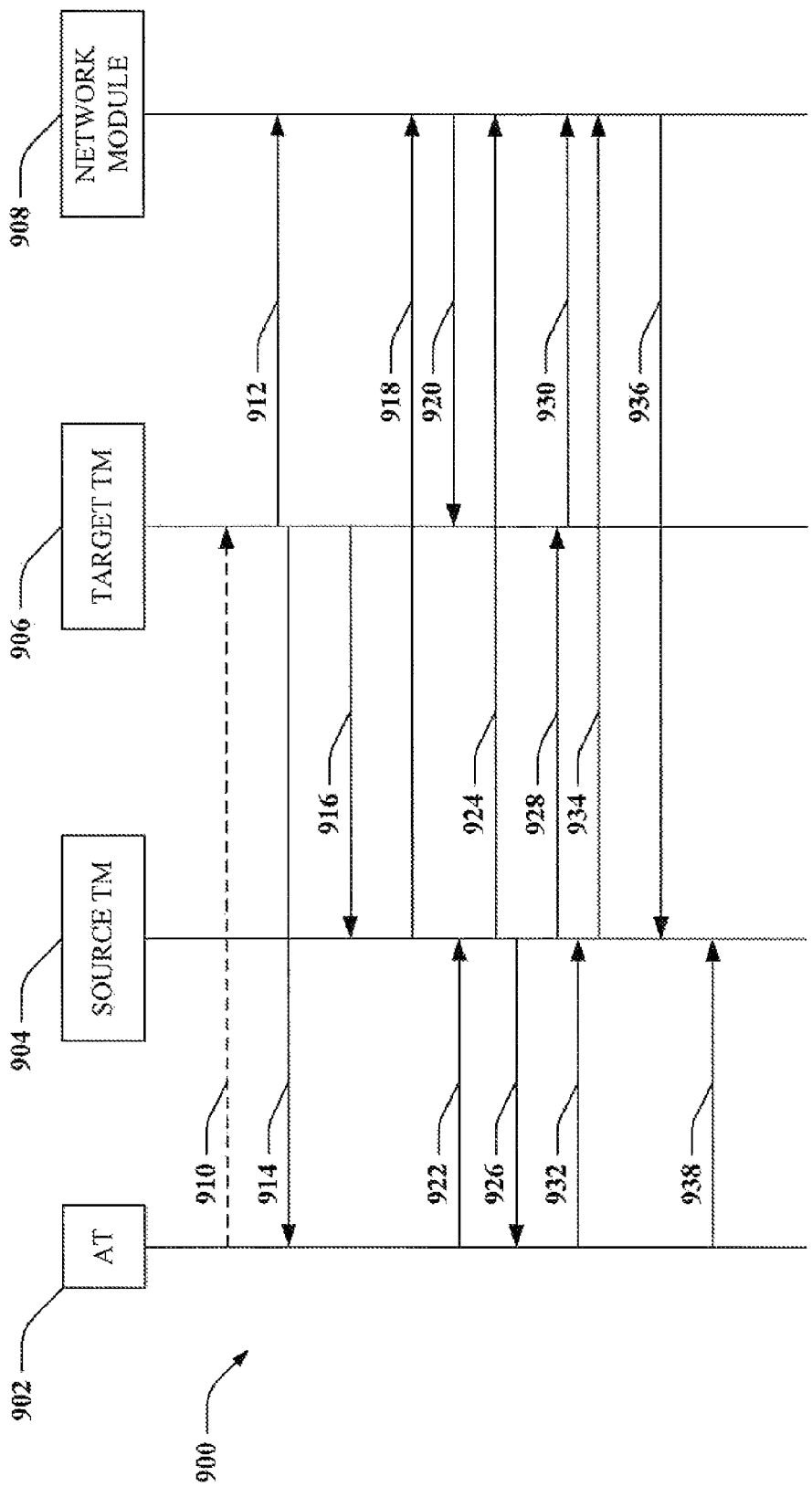
FIG. 9 is a representative flow diagram illustrating interaction amongst modules when a target transceiver module incorrectly detects a handoff of an access terminal.

Now referring to FIG. 9, a flow diagram 900 illustrating actions undertaken by an access terminal 902, a source transceiver module 904, a target transceiver module 906, and a network module 908 when a handoff is incorrectly detected is illustrated. At 910, target transceiver module 906 incorrectly detects that access terminal 902 has requested a handoff from source transceiver module 904 to target transceiver module 906. Accordingly, at 912, target transceiver module 906 indicates (incorrectly) to network module 908 that access terminal 902 has requested the handoff. Additionally, target transceiver module 906 at 914 can generate a reverse link assignment message and transmit such message to access terminal 902. Since access terminal 902 did not, in actuality, request the handoff, however, access terminal 902 will not transmit data to target transceiver module 906 over the created reverse link.

At 916, target transceiver module 906 can send a message to source transceiver module 904 to (incorrectly) indicate that access terminal 902 has requested the handoff. In response to such message, at 918 source transceiver module 904 can flush data from a buffer associated therewith and transmit the data to network module 908. Network module 908 can then indicate that the handoff has been confirmed at 920, thereby enabling target transceiver module 906 to generate receiver status messages for data received from access terminal 902. As access terminal 902 does not desire a handoff, however, no data will be transmitted from access terminal 902 to target transceiver module 906. Rather, access terminal 902 desires to be serviced by source transceiver module 904, and generates a request for reverse link resources to source transceiver module 904 at 922.

The source transceiver module 904 can, at 924, indicate to network module 908 that access terminal 902 desires to be serviced by source transceiver module 904, and at 926 source transceiver module 904 can generate a reverse link assignment message and transmit such message to access terminal 902. Additionally, at 928 source transceiver module 904 can generate and transmit a message to target receiver module 906, wherein the message indicates that source transceiver module 904 will be receiving reverse link data from access terminal 902. Target transceiver module 906 can, upon receipt of the message, flush a data buffer associated therewith at 930. In this example, there will be no data within the buffer, and target transceiver 906 can indicate as much to network module 908. Furthermore, at 932 data can be received from access terminal 902 by source transceiver module 904, and a subset of such data can be relayed to network module 908 at 934. Network module 908 can create receiver status messages for data received at 934 and provide such receiver status messages to access terminal 902 by way of source transceiver module 904. At 936, network module can confirm that source transceiver module 904 is providing reverse link resources to access terminal 902. Therefore, if source transceiver module 904 receives data from access terminal 902 at 938, source transceiver module 904 can generate receiver status messages (e.g., NAKs and/or ACKs) for such data.

Figure 10:
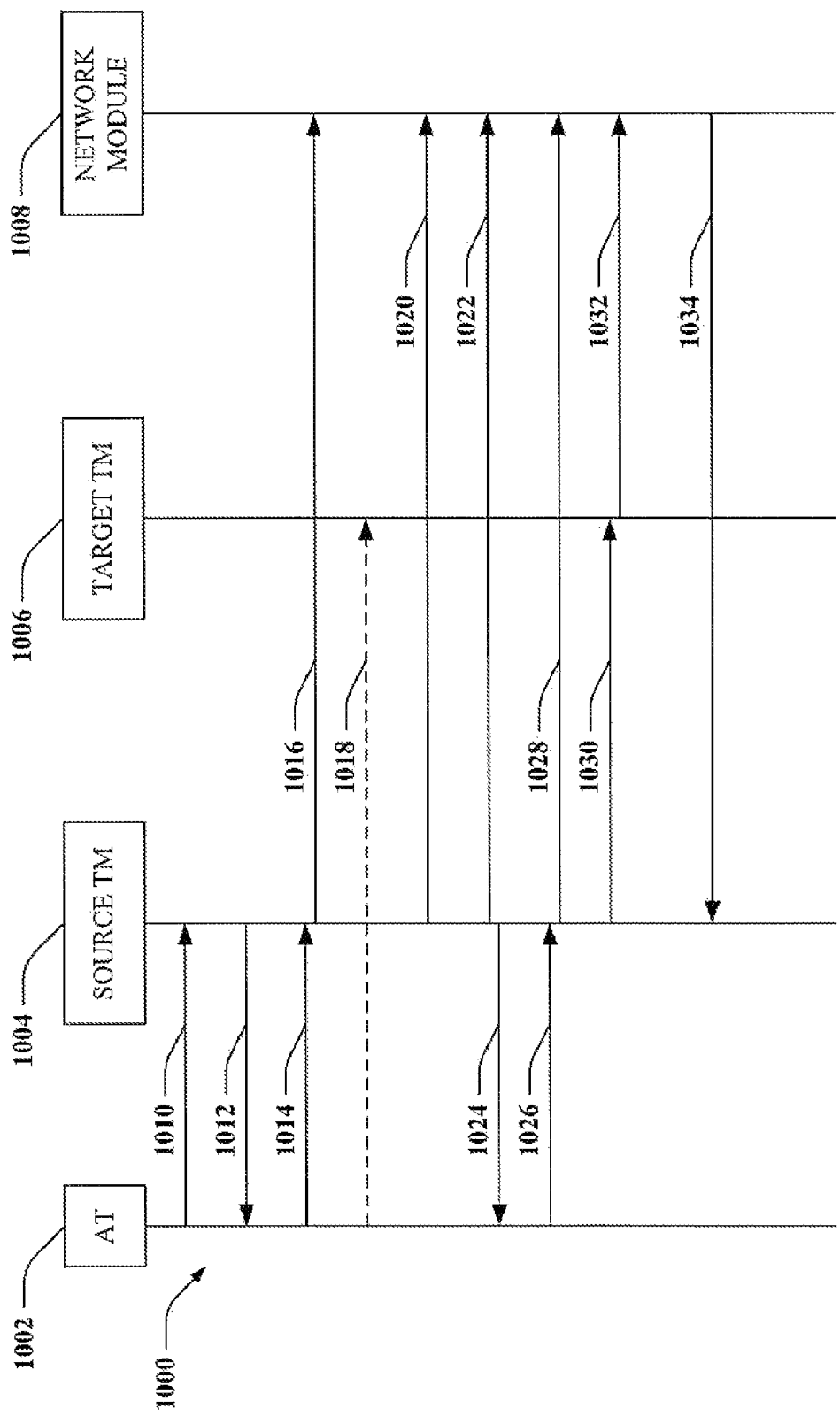
FIG. 10 is a representative flow diagram illustrating interaction amongst modules when a source transceiver module incorrectly detects a handoff of an access terminal.

With reference now to FIG. 10, a flow diagram 1000 illustrating actions undertaken between an access terminal 1002, a source transceiver module 1004, a target transceiver module 1006, and a network module 1008 when a source transceiver module incorrectly detects that a handoff has been requested is depicted. At 1010, access terminal 1002 transmits a request to source transceiver module 1004, and in response at 1012 source transceiver module 1004 generates and transmits a reverse link assignment message to access terminal 1002. Thereafter, at 1014 access terminal 1002 can transmit data to source transceiver module 1004, and at 1016 a subset of such data can be packaged in an appropriate manner and relayed to network module 1008.

At 1018, source transceiver can incorrectly detect that access terminal has requested a handoff to target transceiver module 1006. Source transceiver module 1004 can, at 1020 indicate to network module 1008 that a request for a handoff from source transceiver module 1004 has occurred by flushing data from a buffer therein and transmitting such data to network module 1008. Accordingly, network module 1008 will have knowledge of a buffer state associated with source transceiver module. In actuality, however, access terminal 1002 does not desire a handoff, and continues to transmit data to data to source transceiver module 1004. When source transceiver module 1004 recovers (by sensing that access terminal 1002 continues to transmit data thereto), source transceiver 1004 can act as if there has been a new handoff. In other words, at 1022 source transceiver module 1004 informs network module 1008 that access terminal 1002 is requesting to be serviced by source transceiver module 1004.

At 1024, source transceiver module creates a reverse link assignment message and transmits such message to access terminal 1002. Thereafter, at 1026, access terminal 1002 can transmit data over the reverse link to source transceiver module 1004, and source transceiver module 1004 can package and relay at least a portion of the data to network module 1008 at 1028. During such time, network module 1008 can generate receiver status messages for data received from access terminal 1002 by way of source transceiver module 1004.

At 1030, source transceiver module 1004 can inform target transceiver module 1006 that access terminal 1002 desires to be provided services by source transceiver module 1004. In response to such information, target transceiver module can perform a flush of a buffer associated therewith (with respect to access terminal 1002) at 1032. The flush will not include data, as access terminal 1002 did not desire a handoff. Rather, such flush will act as an indication to network module 1008 that a handoff has been completed. Thus, for instance, a flush message that includes a region for data (if any) can be relayed by target transceiver module 1006 to network module 1008. At 1034 network module 1008 confirms the "handoff", and thereafter source transceiver module 1004 can generate receiver status messages for data received from access terminal 1002.

Figure 11:
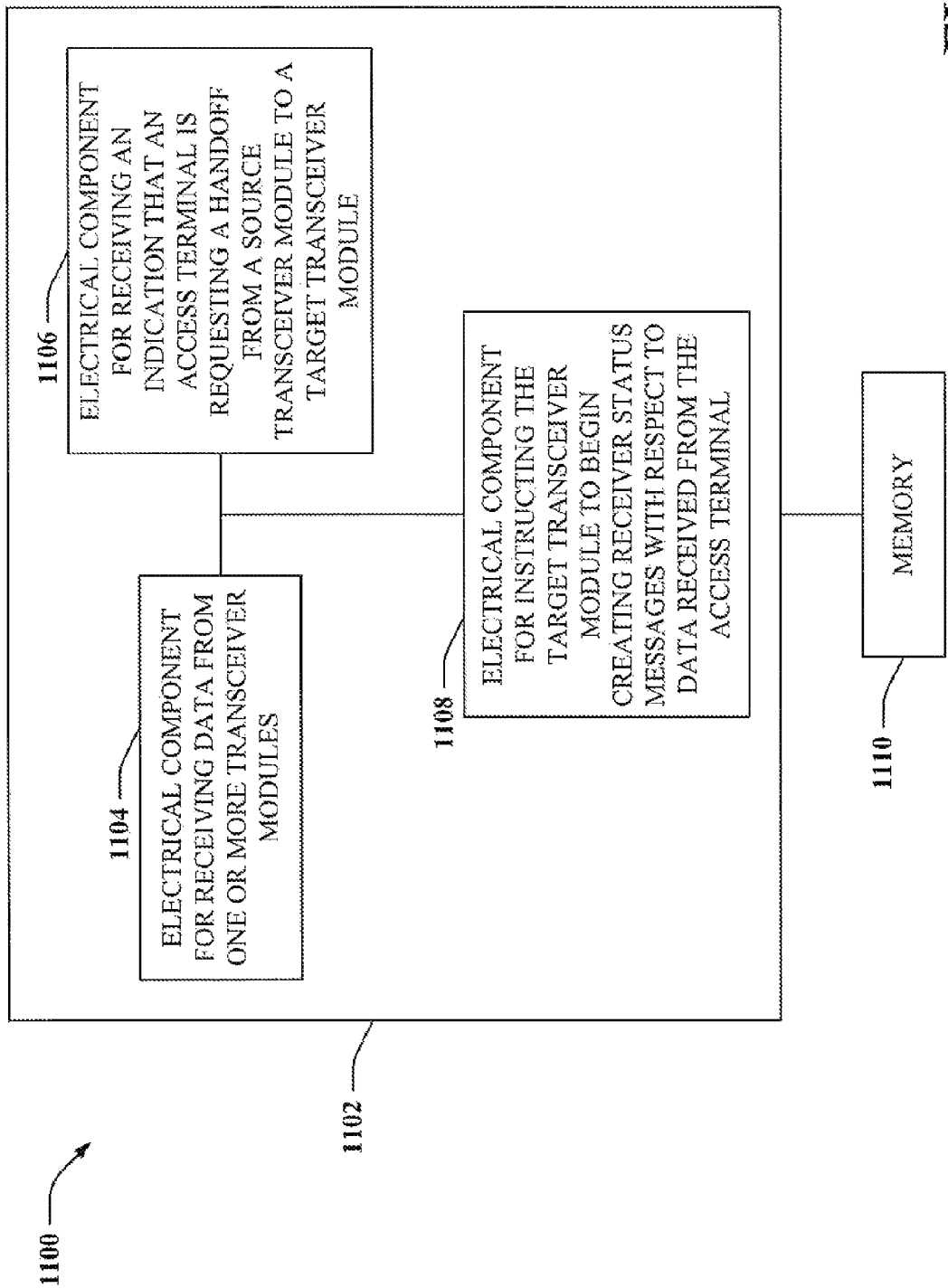
FIG. 11 is an example system that facilitates instructing a transceiver module to begin creating receiver status messages with respect to data received from an access terminal.
Figure 12:
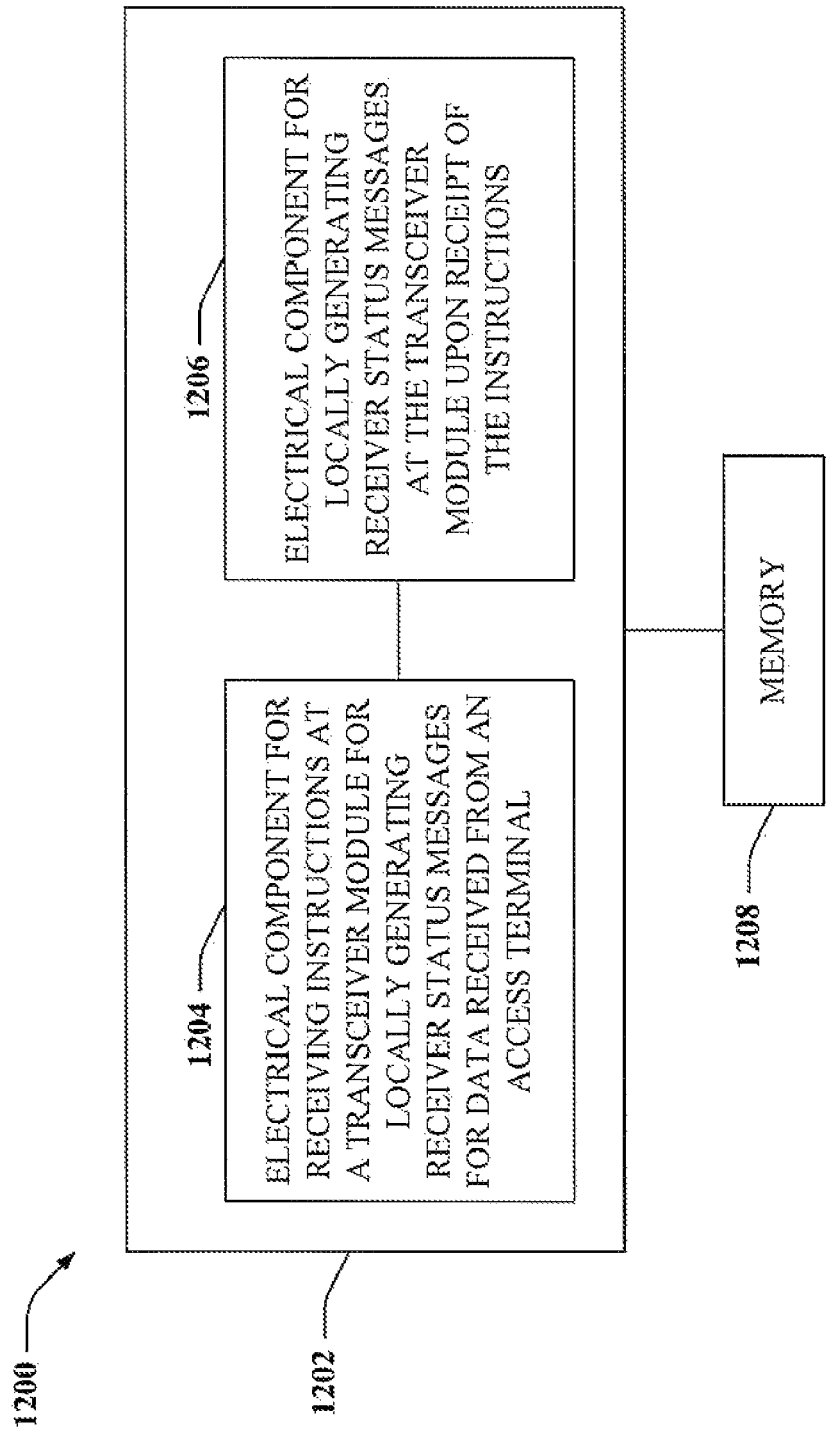
FIG. 12 is an example system that facilitates generating receiver status messages for data received from an access terminal at a network edge.
Figure 13:
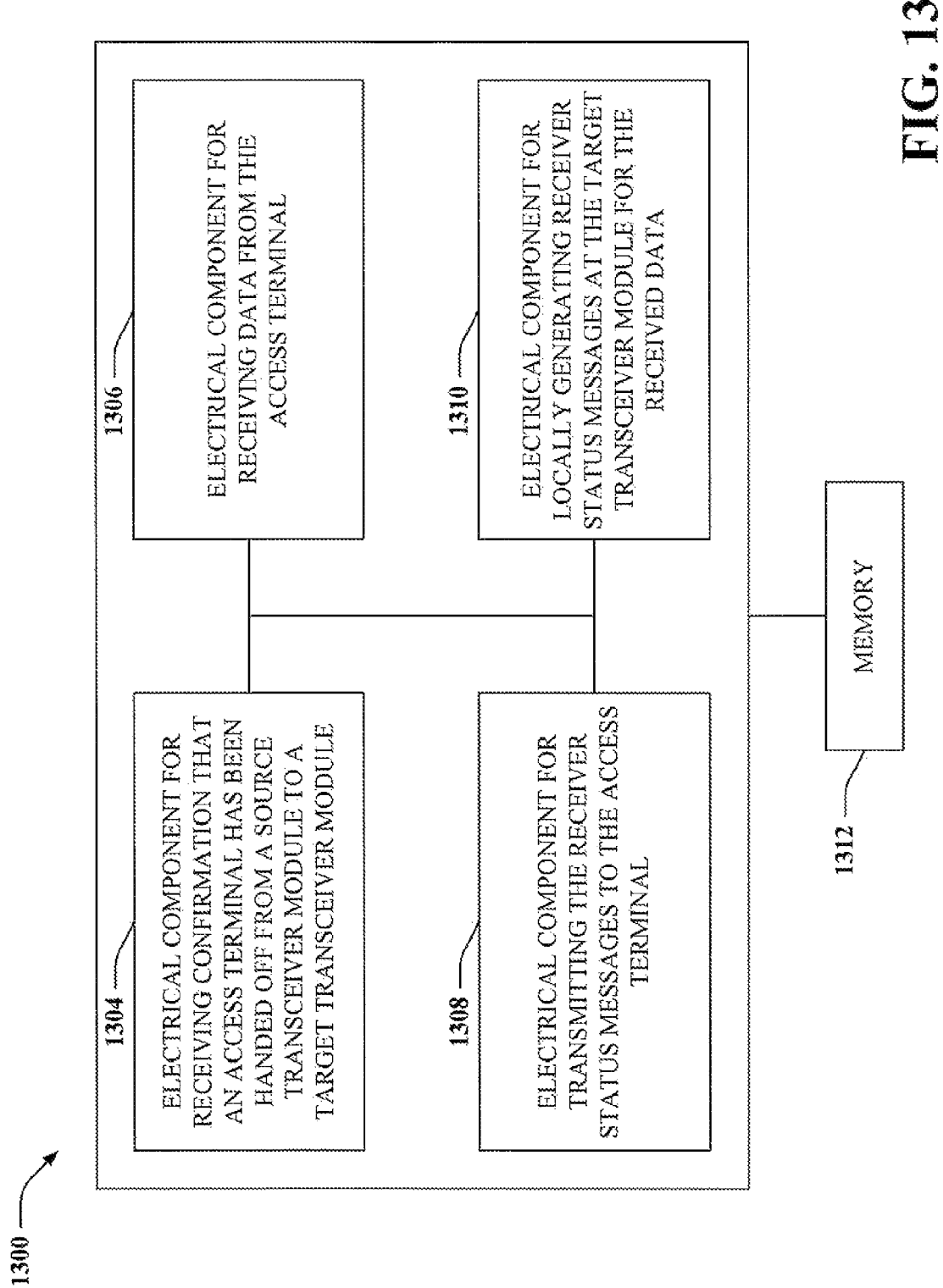
FIG. 13 is an example system that facilitates generating receiver status messages for data received from an access terminal at a network edge.

Now, referring collectively to FIGS. 11-13, systems 1100, 1200, and 1300 are illustrated, wherein such systems relate to generation of receiver status messages for data received from an access terminal. It is to be appreciated that systems 1100, 1200, and 1300 are represented as including functional blocks, wherein such blocks can represent functions implemented by a processor, software, or a combination thereof (e.g., firmware).

Turning specifically to FIG. 11, a system 1100 that facilitates handling generation of receiver status messages with respect to an access terminal during a handoff thereof is illustrated. Pursuant to an example, system 1100 can be comprised by a network module and be resident within a network server. System 1100 includes a grouping 1102 of electrical components that can be utilized in connection with generating receiver status messages. Grouping 1102 includes an electrical component 1104 for receiving data from one or more transceiver modules. For instance, such component 1104 can be a port, cabling, software, and/or the like to facilitate receipt of data from the source transceiver module. Grouping 1102 additionally includes an electrical component 1106 for receiving an indication that an access terminal is requesting a handoff from a source transceiver module to a target transceiver module. An electrical component 1108 for instructing the target transceiver module to begin creating receiver status messages with respect to data received from the access terminal can also be comprised by grouping 1102. System 1100 can also include a memory 1110, which can retain instructions relating to executing components 1104-1108. Alternatively, grouping 1102 and contents thereof can be comprised by memory 1110.

Referring now to FIG. 12, a system 1200 that facilitates generating receiver status messages at a transceiver module is illustrated. Accordingly, a "round trip" of data/messaging is not required between an access terminal, a transceiver module, and a network module. System 1200 includes a grouping 1202 of components, wherein such components operate in conjunction to enable generation of receiver status messages at a transceiver module. Grouping 1202 includes an electrical component 1204 for receiving instructions at a transceiver module for locally generating receiver status messages for data received from an access terminal. Grouping 1202 additionally includes an electrical component 1206 for generating receiver status messages at the transceiver module upon receipt of the instructions. Therefore, when an access terminal is not associated with a handoff, receiver status messages (such as NAKs and/or ACKs) can be created at the network edge. Furthermore, system 1200 includes a memory 1208 that can retain electrical components 1204 and 1206 and/or include instructions relating to executing functionality associated with components 1204 and 1206.

Turning now to FIG. 13, a system 1300 that facilitates handling of generation of receiver status messages during a handoff of an access terminal from a source transceiver module to a target transceiver module is illustrated. Pursuant to an example, system 1300 can be comprised by a base station or other suitable device at an edge of a network. System 1300 includes a grouping 1302 of electrical components that facilitate generating of receiver status messages during handoff of an access terminal from a source transceiver module to a target transceiver module. Grouping 1302 includes an electrical component 1304 for receiving confirmation that an access terminal has been handed off from a source transceiver module to a target transceiver module. Additionally, grouping 1302 can include an electrical component 1306 for receiving data from the access terminal. For instance, such module can be or include an antenna, a receiver chain, and/or any suitable software associated therewith.

Moreover, grouping 1302 can include an electrical component 1308 for generating receiver status messages at the target transceiver module for the received data. Grouping 1302 can also include an electrical component 1310 for transmitting the receiver status messages to the access terminal. For example, the electrical component 1310 may be or include a transmitter, a port, software that aids in transmittal of data, etc. Still further, system 1300 can include a memory 1312, which can retain instructions relating to executing components 1304-1310. Alternatively, grouping 1302 and contents thereof can be comprised by memory 1312.

Figure 14:
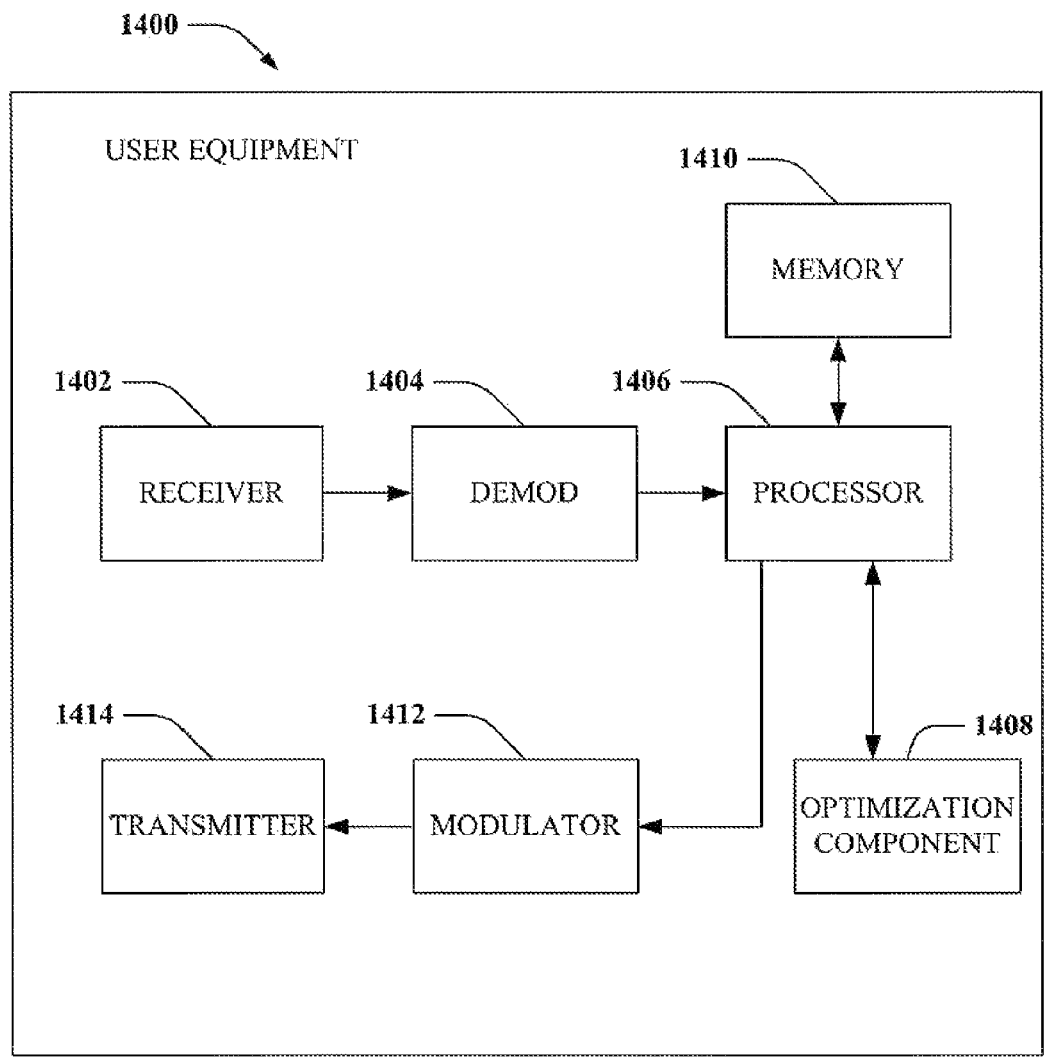
FIG. 14 is an illustration of an example system that can be utilized in connection with requesting a handoff.

FIG. 14 illustrates a system 1400 that can be utilized in connection with generation of receiver status message. System 1400 comprises a receiver 1402 that receives a signal from, for instance, one or more receive antennas, and performs typical actions thereon (e.g., filters, amplifies, downconverts, . . . ) the received signal and digitizes the conditioned signal to obtain samples. A demodulator 1404 can demodulate and provide received pilot symbols to a processor 1406 for channel estimation.

Processor 1406 can be a processor dedicated to analyzing information received by receiver component 1402 and/or generating information for transmission by a transmitter 1414. Processor 1406 can be a processor that controls one or more portions of system 1400, and/or a processor that analyzes information received by receiver 1402, generates information for transmission by a transmitter 1414, and controls one or more portions of system 1400. System 1400 can include an optimization component 1408 that can optimize performance of user equipment before, during, and/or after handoff. Optimization component 1408 may be incorporated into the processor 1406. It is to be appreciated that optimization component 1408 can include optimization code that performs utility based analysis in connection with determining whether to handoff from a source transceiver module to a target transceiver module. The optimization code can utilize artificial intelligence based methods in connection with performing inference and/or probabilistic determinations and/or statistical-based determination in connection with performing handoffs.

System (user equipment) 1400 can additionally comprise memory 1410 that is operatively coupled to processor 1406 and that stores information such as signal strength information with respect to a base station (transceiver module), scheduling information, and the like, wherein such information can be employed in connection with determining whether and when to request a handoff. Memory 1410 can additionally store protocols associated with generating lookup tables, etc. such that system 1400 can employ stored protocols and/or algorithms to increase system capacity. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1410 is intended to comprise, without being limited to, these and any other suitable types of memory. Processor 1406 is connected to a symbol modulator 1412 and transmitter 1414 that transmits the modulated signal.

Figure 15:
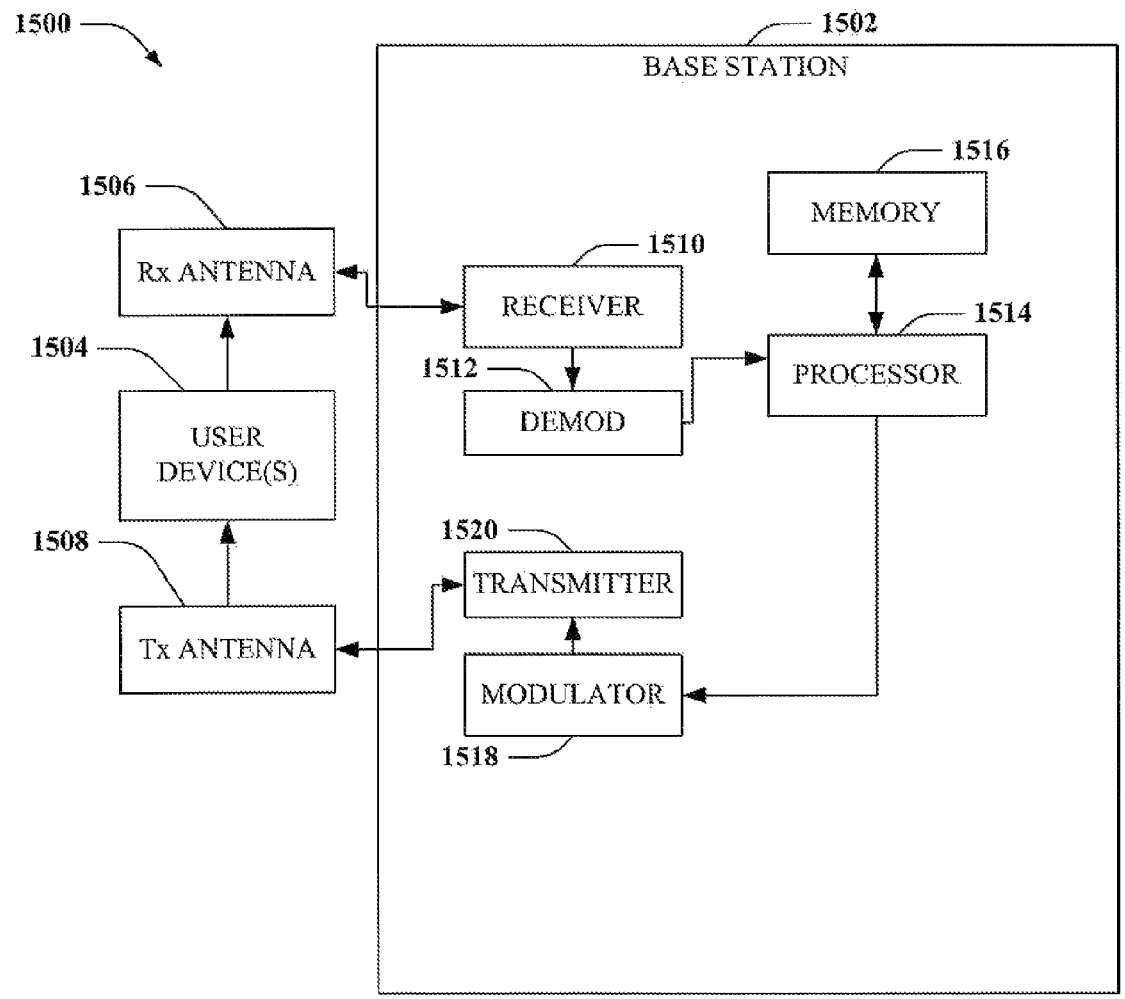
FIG. 15 is an illustration of an example system that can be utilized in connection with generating receiver status messages for data received from an access terminal.

FIG. 15 illustrates a system that may be utilized in connection with receiving an indication of handoff and generating receiver status messages appropriately given such indication. System 1500 comprises a base station 1502 with a receiver 1510 that receives signal(s) from one or more user devices 1504 by way of one or more receives antennas 1506, and transmits to the one or more user devices 1504 through a plurality of transmit antennas 1508. In one example, receive antennas 1506 and transmit antennas 1508 can be implemented using a single set of antennas. Receiver 1510 can receive information from receive antennas 1506 and is operatively associated with a demodulator 1512 that demodulates received information. Receiver 1510 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 1514 that is similar to the processor described above with regard to FIG. 14, and is coupled to a memory 1516 that stores information related to user device assignments, lookup tables related thereto and the like. Receiver output for each antenna can be jointly processed by receiver 1510 and/or processor 1514. A modulator 1518 can multiplex the signal for transmission by a transmitter 1520 through transmit antennas 1508 to user devices 1504.

It is to be understood that the embodiments described herein may be implemented by hardware, software, firmware, middleware, microcode, or any combination thereof. For a hardware implementation, the processing units within an user equipment or a network device may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the systems and/or methods described herein are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. A memory unit may be implemented within the processor or external to the processor, in which case it can be communicatively coupled to the processor through various means.

What has been described above includes examples of the disclosed subject matter. It is, of course, not possible to describe every conceivable combination of components or methodologies for purposes of describing such subject matter, but one of ordinary skill in the art may recognize that many further combinations and permutations are possible. Accordingly, the subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method of handoff in a wireless communications system in which a remote network module is communicatively coupled to a plurality of transceiver modules each located at a network edge, the method comprising:
receiving, at the network module, a handoff indication with respect to a handoff of an access terminal from a source transceiver module to a target transceiver module, wherein the handoff indication is inferred upon receipt of data flushed from a buffer associated with the access terminal in the source transceiver module;
receiving, at the network module and during the handoff, at least a portion of data received at the target transceiver module and originating from the access terminal;

generating, by the network module, a receiver status message for the at least the portion of data received during the handoff;

determining a state of a buffer associated with the access terminal in the target transceiver module;

confirming the handoff based at least on the state of the buffer associated with the access terminal in the target transceiver module; and ceasing to generate subsequent receiver status messages for data originating from the access terminal and received at the target transceiver module after the confirming of the handoff, and providing an instruction to the target transceiver module to locally generate the subsequent receiver status messages.

2. The method of claim 1, wherein the receiver status message generated at the network module and the subsequent receiver status messages generated at the target transceiver module comprise one of a negative acknowledgment (NAK) and an acknowledgment (ACK).

3. The method of claim 1, wherein prior to the handoff indication, the source transceiver module locally generates receiver status messages for data originating from the access terminal, and the method further comprising the network module, upon receipt of the handoff indication, providing the source transceiver module with an indication to cease generating receiver status messages.

4. The method of claim 1, further comprising:
receiving a request to generate a receiver status message from the target transceiver module; and
transmitting an acceptance message to the target transceiver module in response to the request to confirm the handoff.

5. The method of claim 4, wherein receiving data flushed from the source transceiver module further comprises receiving prior to transmitting the acceptance message.

6. The method of claim 1, further comprising instructing the target transceiver module to generate a receiver status message to confirm the handoff.

7. The method of claim 6, wherein the instructing further comprises instructing the target transceiver module upon receipt of the data flushed from the source transceiver module.

8. A server configured to perform the method of claim 1.

9. A non-transitory computer-readable medium for use in a remote network module that is communicatively coupled to a plurality of transceiver modules each located at a network edge of a wireless communications system, the medium comprising computer-executable instructions for:

receiving, at the network module, a handoff indication of a handoff of an access terminal from a source transceiver module to a target transceiver module, wherein the handoff indication is inferred upon receipt of data flushed from a buffer associated with the access terminal in the source transceiver module;

receiving at the network module and during the handoff, at least a portion, of data received at the target transceiver module and originating from the access terminal;

generating, by the network module, a receiver status message for the at least the portion of data received during the handoff;

determining a state of a buffer associated with the access terminal in the target transceiver module;

confirming the handoff based at least on the state of the buffer associated with the access terminal in the target transceiver module; and ceasing to generate subsequent receiver status messages for data originating from the access terminal and received at the target transceiver module after the confirming of the handoff, and instructing the target transceiver module to locally generate the subsequent receiver status messages.

10. The computer-readable medium of claim 9, wherein the receiver status message generated at the network module and the subsequent receiver status messages generated at the target transceiver module comprise one of a NAK and an ACK.

11. The computer-readable medium of claim 9, further comprising computer-executable instructions for:
generating a receiver status message with respect to data received from the source transceiver module; and
transmitting the receiver status message to the target transceiver module for relay to the access terminal.

12. The computer-readable medium of claim 9 further comprising computer-executable instructions for:
receiving a request to create receiver status messages locally at the target transceiver module; and
transmitting an acceptance message to the target transceiver module in response to the request.

13. A network server comprising the computer-readable medium of claim 9.

14. A communications apparatus for use in a remote network module that is communicatively coupled to a plurality of transceiver modules each located at a network edge, the apparatus comprising:

a memory that comprises instructions for:
receiving, at the network module, a handoff indication of a handoff of an access terminal from a source transceiver module to a target transceiver module, wherein the handoff indication is inferred upon receipt of data flushed from a buffer associated with the access terminal in the source transceiver module;

receiving, at the network module and during the handoff, at least a portion of data received at the target transceiver module and originating from the access terminal;

generating, by the network module, a receiver status message for the at least the portion of data received during the handoff;

determining a state of a buffer associated with the access terminal in the target transceiver module; and confirming the handoff based at least on the state of the buffer associated with the access terminal in the target transceiver module; and ceasing to generate subsequent receiver status messages for data originating from the access terminal and received at the target transceiver module after the confirming of the handoff, and instructing the target transceiver module to locally generate the subsequent receiver status messages; and a processor configured to execute the instructions.

15. The communications apparatus of claim 14, wherein the receiver status message generated at the network module and the subsequent receiver status messages generated at the target transceiver module include one or more of an ACK and a NAK.

16. The communications apparatus of claim 14, wherein prior to the handoff indication, the source transceiver module locally generates receiver status messages for data originating from the access terminal, and the memory comprises further instructions for instructing the source transceiver module to cease generating receiver status messages upon receipt of the indication that the access terminal is requesting the handoff.

17. A communications apparatus for use in a network module that is communicatively coupled to a plurality of transceiver modules each located at a network edge, the apparatus comprising:

means for receiving, at the network module, a handoff indication with respect to a handoff of an access terminal from a source transceiver module to a target transceiver module, wherein the handoff indication is inferred upon receipt of data flushed from a buffer associated with the access terminal in the source transceiver module;

means for receiving, at the network module and during the handoff, at least a portion of data received at the target transceiver module and originating from the access terminal;

means for generating, at the network module, a receiver status message for the at least the portion of data received during the handoff;

means for determining a state of a buffer associated with the access terminal in the target transceiver module;

means for confirming the handoff based at least on the state of the buffer associated with the access terminal in the target transceiver module;

means for ceasing to generate subsequent receiver status messages for data originating from the access terminal and received at the target transceiver module after the confirming of the handoff; and means for instructing the target transceiver module to locally generate the subsequent receiver status messages after the confirming of the handoff.

18. The communications apparatus of claim 17, wherein the receiver status message generated at the network module and the subsequent receiver status messages generated at the target transceiver module comprise one or more of NAKs and ACKs.

19. The communications apparatus of claim 17, wherein prior to the handoff indication, the source transceiver module locally generates receiver status messages for data originating from the access terminal, and further comprising, upon receipt of the handoff indication, means for instructing the source transceiver module to cease creating receiver status messages.

20. A processor for use in a network module that is communicatively coupled to a plurality of transceiver modules each located at a network edge, the processor configured to execute instructions for:

receiving, at the network module, a handoff indication of a handoff of an access terminal from a source transceiver module to a target transceiver module, wherein the handoff indication is inferred upon receipt of data flushed from a buffer associated with the access terminal in the source transceiver module;

receiving, at the network module and during the handoff, at least a portion of data received at the target transceiver module and originating from the access terminal;

generating, by the network module, a receiver status message for the at least the portion of data received during the handoff;

determining a state of a buffer associated with the access terminal in the transceiver module;

confirming the handoff based at least on the state of the buffer associated with the access terminal in the target transceiver module; and ceasing to generate subsequent receiver status messages for data originating from the access terminal and received at the target transceiver module after the confirming of the handoff, and instructing the target transceiver module to locally generate the subsequent receiver status messages.

21. The processor of claim 20, wherein the receiver status message generated at the network module and the subsequent receiver status messages generated at the target transceiver module comprise one or more of ACKs and NAKs.

22. The processor of claim 20 configured to execute instructions for instructing the source transceiver module to cease creating receiver status messages for data received from the access terminal.

23. The method of claim 1, wherein the network module is configured to provide a network attachment point to the access terminal, and the source and the target transceiver modules are configured to provide respective air interface attachments for the access terminal.

24. The method of claim 1, wherein determining the state of the buffer associated with the access terminal in the target transceiver module comprises updating the buffer associated with the access terminal in the target transceiver module with data received from the source transceiver module during the handoff.

25. The method of claim 1, wherein confirming the handoff based on the state of the buffer associated with the access terminal in the target transceiver module is in response to receiving data flushed from the buffer associated with the access terminal in the target transceiver module.

* * * * *